March 31, 1925. 1,531,405
B. LEHMAN
STOVE
Filed May 10, 1924 3 Sheets-Sheet 1

Inventor
BERT LEHMAN,
By Toulmin & Toulmin,
Attorneys

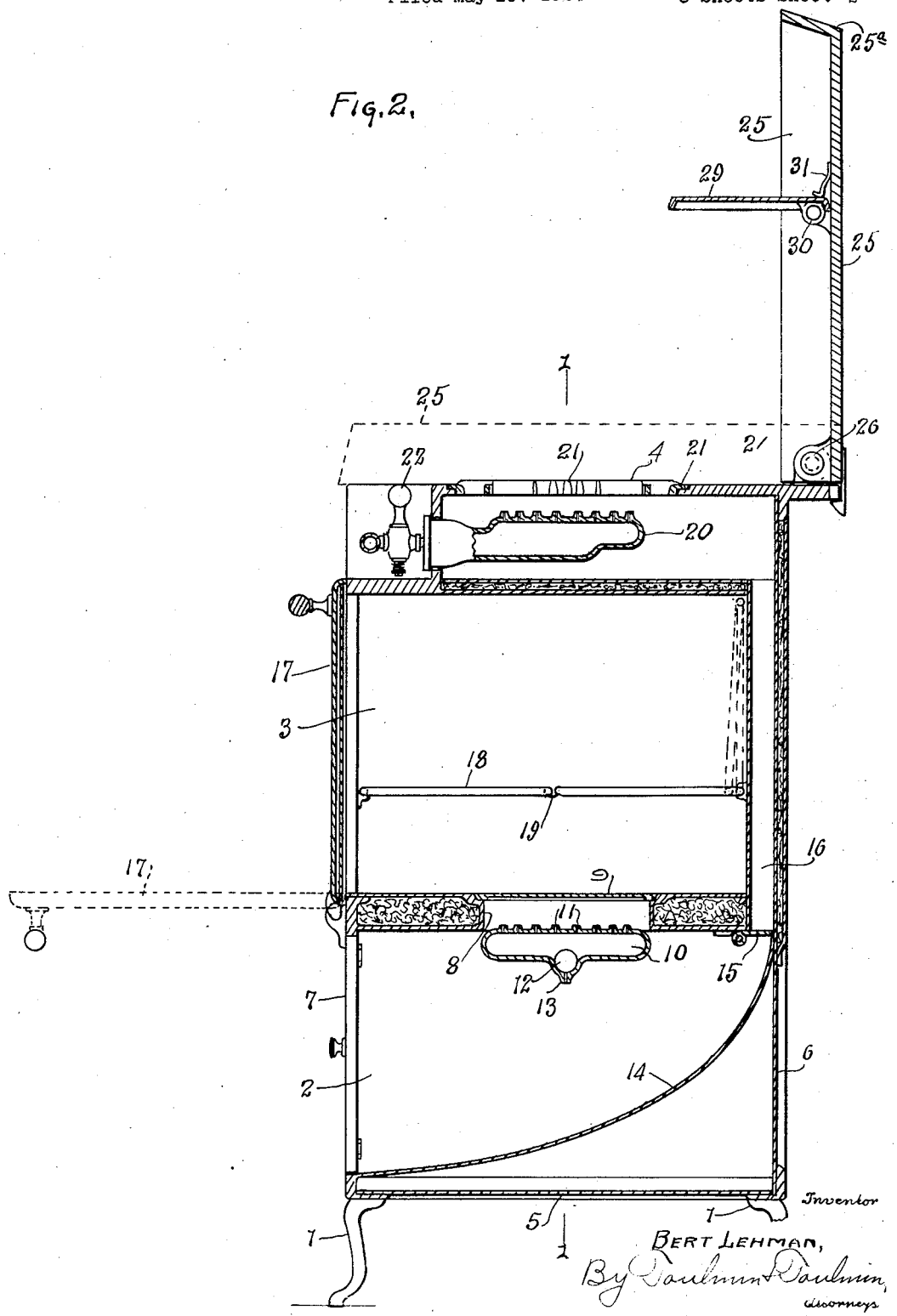

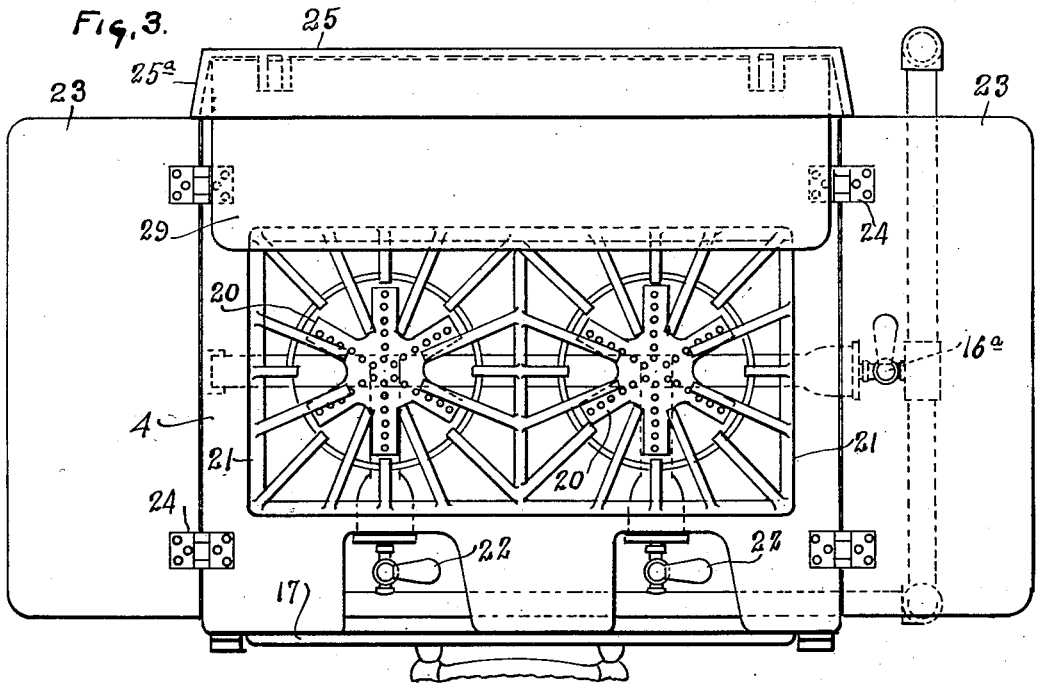
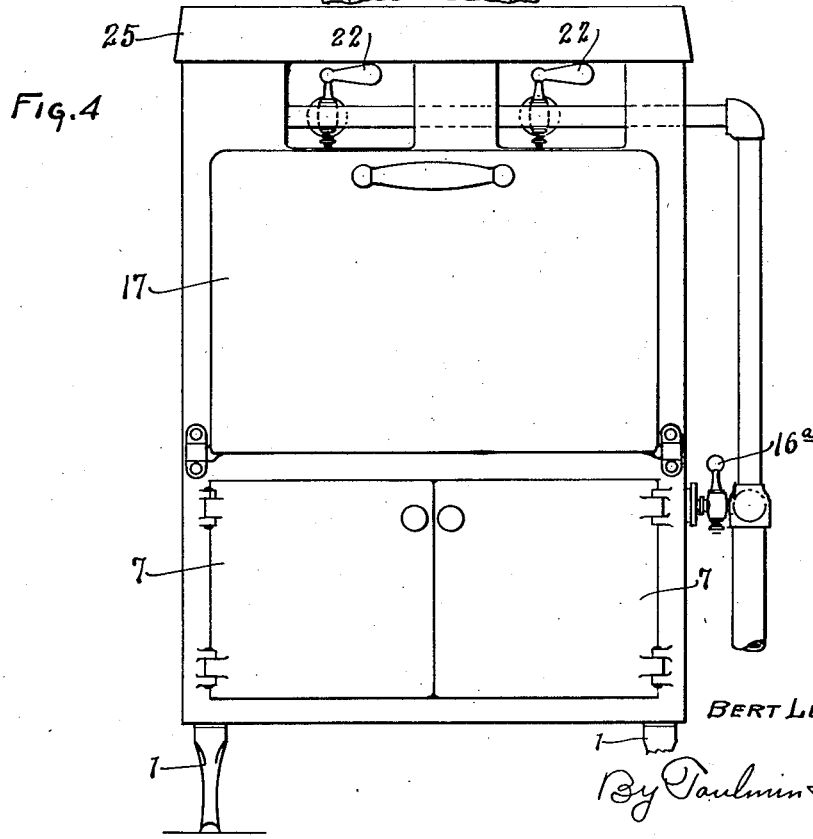

Patented Mar. 31, 1925.

1,531,405

UNITED STATES PATENT OFFICE.

BERT LEHMAN, OF PIQUA, OHIO.

STOVE.

Application filed May 10, 1924. Serial No. 712,466.

*To all whom it may concern:*

Be it known that I, BERT LEHMAN, a citizen of the United States, residing at Piqua, in the county of Miami and State of Ohio, have invented certain new and useful Improvements in Stoves, of which the following is a specification, reference being had therein to the accompanying drawing.

This invention relates to stoves and more particularly to combined cooking and heating stoves.

The principal object of the invention is to make a stove in imitation of a cabinet, particularly a phonograph cabinet, there being a cover which when closed combined with the general appearance of the stove frame makes the complete structure a close imitation in appearance of such a cabinet.

It is a further object of the invention to provide such stove with three divisions—a generating and heat deflecting compartment, a baking compartment, and a general cooking surface, the three divisions adapted to be used at the same time or separately, as desired.

It is a further object of the invention to provide a partition between the heating compartment and the oven compartment, formed with flues and having removable lids and to provide a space between the back wall of the oven compartment and the cabinet communicating with the heating compartment, which will permit of additional heat being supplied to the oven compartment.

It is a further object of the invention to provide a special burner for the heating and oven compartments with twyers or jets directed upwardly to heat the baking compartment and twyers or jets directed downwardly for the heating compartment.

It is a further object of the invention to provide a folding shelf for the baking compartment which eliminates the necessity of removing entirely the shelf with which ovens are usually supplied when desired to utilize the whole interior of the oven.

It is a further object of the invention to provide extensions for the general cooking surface and gear connections between these extensions and the cover for the stove to make the extensions operable when adjusting the cover.

It is also an object of the invention to provide the stove cover with a shelf which may be utilized to great advantage when the cover is up and the general cooking surface is being used.

In the accompanying drawings:

Figure 2 is a sectional view taken on the line 2—2 of Figure 1;

Figure 3 is a plan view of a stove embodying my invention with the cover up and the extensions in extended position, and Figure 4 is a front elevation of the stove when not in use which clearly brings out the cabinet principle.

Figure 1:
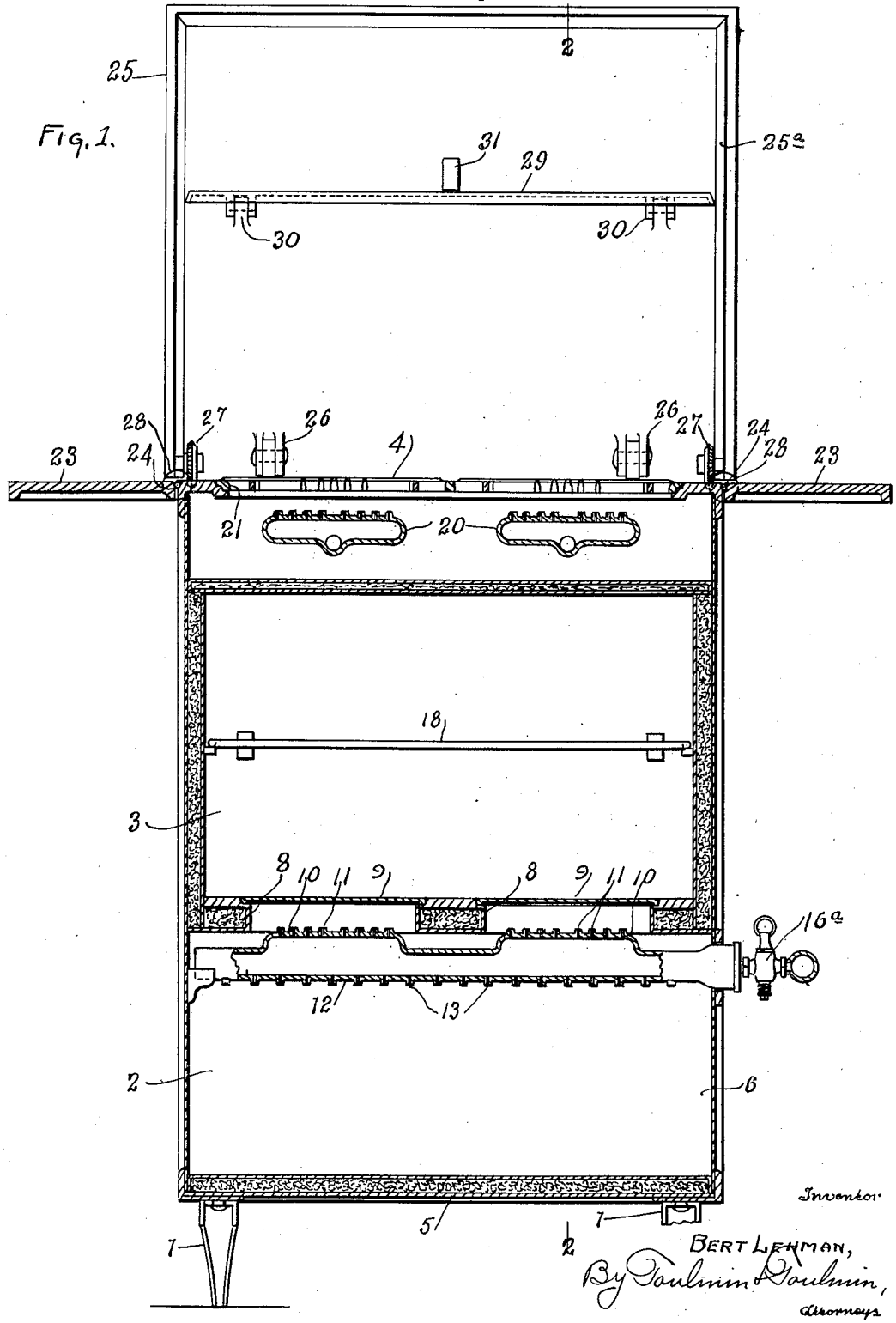
Figure 1 is a sectional view taken on the line 1—1 of Figure 2.

In these drawings, 1 designates the legs or supports for my improved stove, which is composed of a general frame having sides, front and cover fashioned after the manner of a cabinet and divided into three divisions, a heating compartment 2, a baking or oven compartment 3, and a general cooking surface 4. The heating compartment is comprised of a bottom 5, back wall 6 and open front. Doors 7 are provided for this front space which may be kept closed when it is desired to prevent the heat generated by a suitable burner from entering the room, and opened when it is desired to have the heat enter the room. These doors may be made of suitable design and in the present instance I have shown them of such design as to carry out the cabinet effect. While I have utilized two doors, of course, it will be understood that one door may be substituted therefor.

At the top of the heating compartment is a partition formed with flues 8 adapted to be closed by removable lids 9. A burner is located in the heating compartment and consists of a member 10 having a series of holes 11 adapted to direct the gas flame upwardly into the flues 8 to heat the oven compartment, and a member 12 having holes 13 adapted to direct the gas flames downwardly into the heating compartment where they may be deflected out into the room by the portion or deflector 14. When it is desired to utilize the heat from the member 12 of the burner to assist in heating the baking compartment or in case it is preferred not to have any of the heat enter the room, I have provided a damper 15, whereupon by closing the doors 7 and opening the damper the heat generated in the heating compartment will be carried up through the opening 16 between the wall of the oven and the cabinet frame. Any suitable control for the burner may be employed, as shown at 16ª.

Referring to the baking or oven compartment, it will be understood that the partition between the heating compartment and the baking compartment forms the bottom of the stove. This oven compartment is provided with the usual door, as shown at 17. Ovens generally are provided with one or more racks and means of supporting the same. However, if it is desired to utilize the entire interior of the oven to accommodate a large roaster or other cooking vessel, it is necessary to remove these racks or grates. In the present instance I have shown a grate or shelf 18 which is jointed at 19 and adapted to be folded and pushed back against the wall of the oven as clearly shown in Figure 2. This is of material advantage as will readily appear.

The heat of the oven may be regulated not only by controlling the amount of gas supplied to the burner but also by the lids 9, which when positioned over the flues 8 will tend to greatly reduce the heat and enable the oven to be utilized as a cooker rather than a baker. This is particularly desirable when cooking certain kinds of food which fill the house with objectionable odors. The temperature of the oven may also be increased or decreased by opening or closing the damper 15.

Referring now to the division comprising the general cooking surface, more clearly seen in Figure 3, it will be noted that I have provided burners 20 and grates 21 adapted to be placed over the same. These burners have the usual controls 22. At either end of the general cooking surface I have provided extensions 23 hinged at 24 to the cabinet frame and adapted to be folded over onto the cooking surface when the same is not being used. A cover having a flat surface 25 and sloping sides 25ª is hinged at 26 and serves when down to conceal from view the division comprising the general cooking surface when the same is not in use and gives to the structure the cabinet-like appearance. When the cover is up it protects the wall of the room while cooking is being done on the cooking surface. This cover and the extensions 23 are provided with bevelled gears 27 and 28 respectively, which mesh with one another so that when the cover is raised the extensions will be moved to extended position, as shown in Figure 1, and when the cover is lowered the extensions will be folded over onto the general cooking surface beneath said cover. The cover has a shelf 29 hinged at 30 and braced by a strap 31. When the cover is raised the shelf 29 assumes a position at right angles thereto and is useful in accommodating small vessels or dishes which the person doing the cooking may care to place thereon.

While I have shown and described certain features as constituting my invention, it will be understood that parts have been shown for purposes of illustration only, and that I do not desire to be limited to such details, as obvious modifications will occur to a person skilled in the art. For instance, different forms of burners may be used in the heating compartment, as well as a general rearrangement of the divisions.

Having thus fully described my invention, what I claim as new and desire to secure by Letters Patent, is:—

1. As an entirety a new article of manufacture, consisting of a stove composed of a general frame having a bottom and sides, a heating compartment provided with a deflector to throw the heat out into a room when desired, doors to close the front of said heating compartment, a damper and flue, whereby the heat from the heating compartment may be prevented from escaping into the room by closing said doors and opening said damper, a burner located in the upper part of said heating compartment, one part of said burner directing the jets downwardly and the other upwardly, a baking compartment located above said heating compartment, an insulated partition between said heating and baking compartments having an opening therein adapted to permit the upwardly directed jets from said burner to heat said baking compartment, a lid for closing said opening to regulate the heating of said baking compartment, a foldable shelf in said baking compartment and a door to close said baking compartment, a general cooking surface and burners therefor positioned above said baking compartment and a cover secured to said frame, adapted when closed to obscure from view the general cooking surface and give the structure as a whole the appearance of a cabinet and when open to provide protection for the wall back of the structure, said cover being provided with a shelf extended at right angles thereto when the cover is in open position.

2. A new article of manufacture consisting of a stove composed of a general frame having sides, a front and a cover fashioned after the manner of a cabinet and divided interiorly into a heating compartment and a baking compartment and provided with a general cooking surface beneath the cover, extensions hinged to two opposite sides of said frame and adapted to be folded over onto the general cooking surface, gearing interconnecting said cover and extensions whereby when said cover is raised said extensions will be moved to extended position, and when said cover is lowered they will be moved to folded position and rest on said general cooking surface beneath said cover.

In testimony whereof I affix my signature.

BERT LEHMAN.